E. FUCHS.
SUSPENSION DEVICE FOR CATERPILLAR VEHICLES.
APPLICATION FILED SEPT. 12, 1917.

1,336,832.

Patented Apr. 13, 1920.
3 SHEETS—SHEET 3.

Inventor.
Ernest Fuchs

UNITED STATES PATENT OFFICE.

ERNEST FUCHS, OF BILLANCOURT, FRANCE, ASSIGNOR TO LOUIS RENAULT, OF BILLANCOURT, FRANCE.

SUSPENSION DEVICE FOR CATERPILLAR-VEHICLES.

1,336,832.  Specification of Letters Patent.  Patented Apr. 13, 1920.

Application filed September 12, 1917.  Serial No. 190,923.

*To all whom it may concern:*

Be it known that I, ERNEST FUCHS, engineer, of 15 Rue Gustave Sandoz, at Billancourt, Department of the Seine, France, citizen of the French Republic, have invented certain new and useful Improvements in or Relating to Suspension Devices for Caterpillar-Vehicles; and I do hereby declare the following to be a full, clear, and exact description of the invention, such as will enable others skilled in the art to which it appertains to make and use the same.

The present invention relates to a system of suspension for caterpillar vehicles.

These vehicles are required to travel over uneven ground and it is important that the caterpillars shall closely engage the surface of the ground and exert upon it a practically uniform pressure for the purpose of preventing, at certain points on the ground, such a pressure as to cause the skidding of the caterpillar.

To this end, the weight of the vehicle is distributed in a practically uniform manner over antifriction rollers by means of springs, lever arms and bogies, which allow the rollers to follow the deformations of the caterpillar which does the propelling within wide limits without modifying the distribution of the load upon the rollers.

The accompanying drawings represent, by way of example, a system of suspension according to the invention.

Figure 1:
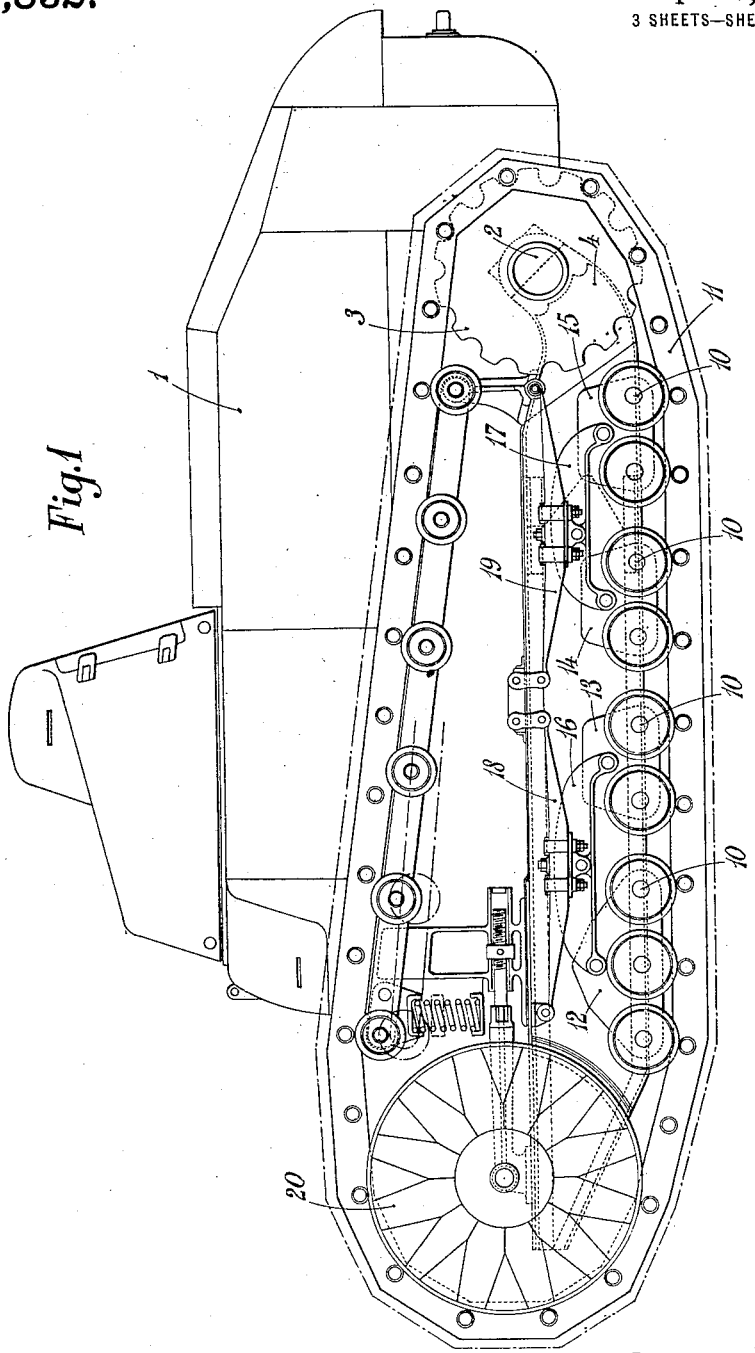
Figure 1 is a diagrammatic view in elevation of the whole of a tractor.
Figure 2:
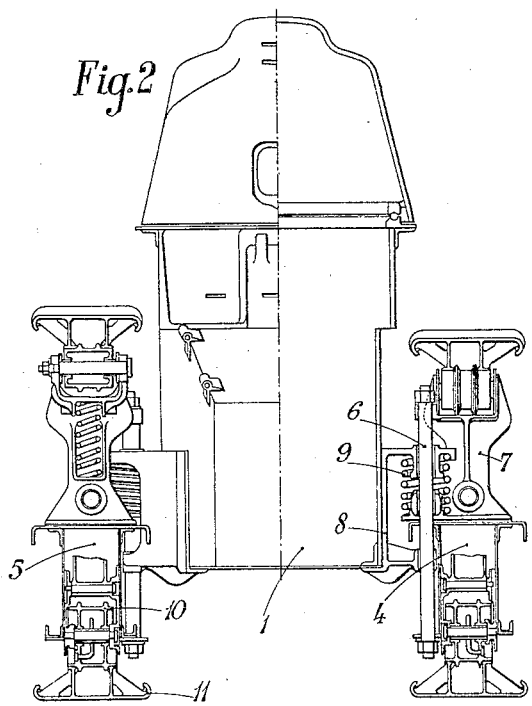
Fig. 2 is an end view.
Figure 3:
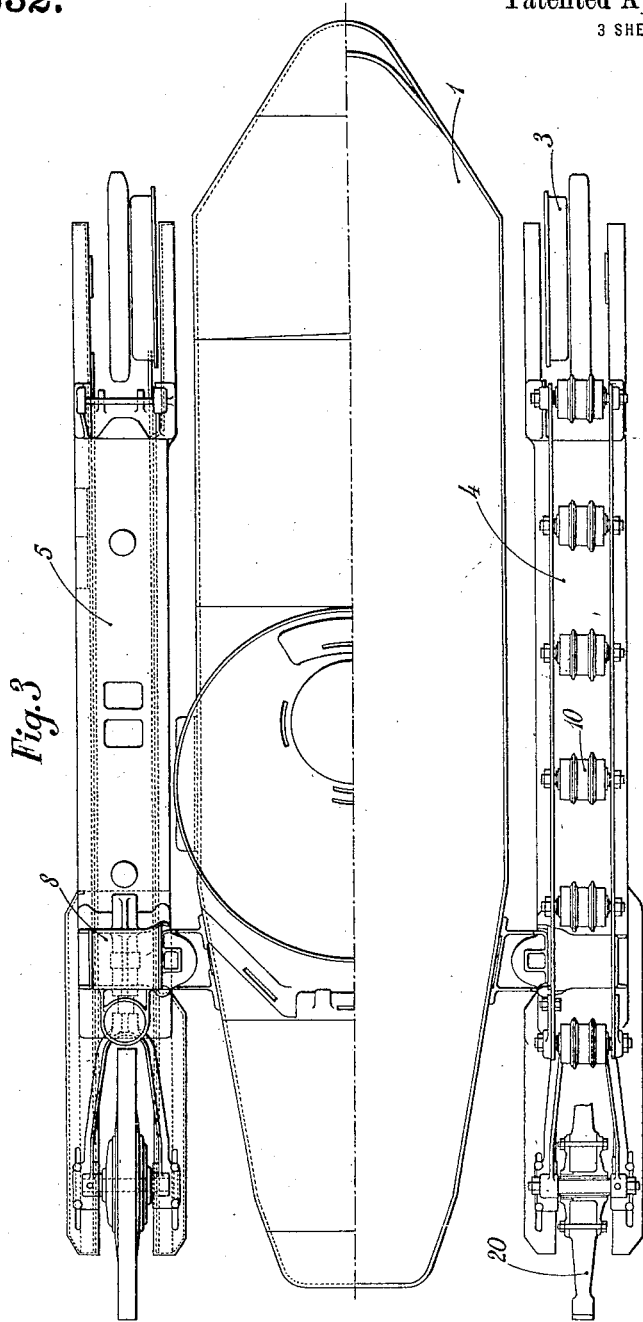
Fig. 3 is a plan view.

The body 1 of the vehicle is pivoted to the rear axle 2 of the chain or trailing wheel 3. Two bearers 4 and 5 serve to support this body and are both connected on the one hand to the axle 2 by pivots and on the other hand to the front of the body by an elastic suspension. This elastic suspension shown in section in the right hand half of Fig. 2 comprises a guide bar 6 fixed by a bracket 7 to the bearer 4. A piece 8 carried by the body of the vehicle engages the rod 6 on either side of the lower part of the bracket 7 and a spring 9 placed between a seat on the piece 8 and the bearer 4 supports the body elastically.

The bearers 4 and 5 inclose the rollers 10 which roll over the caterpillar 11 of the tractor. These rollers are connected to the bearers in such a way that the load shall be distributed uniformly over the whole of the caterpillar. To attain this result, use is made of bogies 12, 13, 14 and 15, connecting two or more rollers 10. These bogies are pivoted in pairs by lever arms 16 and 17, which in their turn are connected to the bearers 4 and 5, by leaf springs 18 and 19 by pivoted points. The weight of the body is therefore supported by the two points of the bearers, which distribute the weight uniformly over the antifriction rollers and over the caterpillar. The front pulley 20, over which the caterpillar passes and also the caterpillar driving wheel 3 do not bear upon the ground and do not intervene in the distribution of the weights.

It is to be understood that the invention is not limited to the number of rollers, bogies, lever arms or springs shown and that the leaf spring may be replaced by helical springs.

I claim:

1. In a caterpillar vehicle, the combination with a body, of a pivoted bearer mounted thereon, a lever carried by the bearer, bogies carried by the lever, rollers carried by the bogies, and a caterpillar passing under said rollers.

2. In a caterpillar vehicle, the combination with a body, of a bearer connected thereto, levers carried adjacent to the front and rear ends of said bearer, bogies carried by the levers, rollers carried by the bogies, and a caterpillar passing under said rollers.

3. In a caterpillar vehicle, the combination with a body, of a pivoted bearer carried thereby, a lever pivoted between its ends on said bearer, a bogie pivoted on each end of the lever, rollers carried by each bogie, and a caterpillar passing under the rollers.

4. In a caterpillar vehicle, the combination with a body, of a bearer connected thereto, levers pivoted between their ends adjacent to the front and rear ends of the bearer, a bogie pivoted on each end of each lever, rollers carried by the bogies, and a caterpillar passing under the rollers.

5. In a caterpillar vehicle, the combination with a body, of a bearer connected thereto, levers pivoted between their ends adjacent to the front and rear of the bearer, a bogie carried by each end of the levers, rollers carried by the bogies, and a caterpillar passing under the rollers.

6. In a caterpillar vehicle, the combination with a body, of a bearer pivoted at the rear end thereof, a resilient mounting for the front end of the bearer, a lever pivoted adjacent to the front end of the bearer, a bogie carried by the lever, rollers mounted on the bogie, and a caterpillar passing under the rollers.

7. In a caterpillar vehicle, the combination with a body, of a bearer pivoted adjacent to the rear end thereof, a resilient mounting for the front end of the bearer, a lever pivoted adjacent to the front end of the bearer, a bogie carried by each end of the lever on opposite sides of its pivot point, rollers mounted on the bogie, and a caterpillar passing under the rollers.

8. In a caterpillar vehicle, the combination with a body, of a bearer pivoted thereto at one of its ends, levers carried adjacent to the front and rear ends of the bearer, a spring connection between each of the levers and the bearer, a bogie carried by each lever, rollers mounted on the bogies, and a caterpillar passing under the rollers.

9. In a caterpillar vehicle, the combination with a body, of a bearer pivoted thereto, adjacent to one of its ends, a yieldable mounting for the other end of the bearer, a lever mounted adjacent to each end of the bearer, the pivot point of each lever being between its ends, a bogie pivoted on each end of each of the levers, rollers carried by the bogies, and a caterpillar passing under the rollers.

10. In a caterpillar vehicle, the combination with a body, of a bearer pivoted thereto, means for applying downward pressure to the bearer and tending to move the same about its pivot point, a lever adjacent to the front end of the bearer, a pivot-spring connection between the bearer and lever, a bogie carried by the lever, rollers carried by the bogie, and a caterpillar passing under the rollers.

11. In a caterpillar vehicle, the combination with a body, of a pivoted bearer, means tending to move the bearer downwardly about its pivot point, a lever located adjacent to each end of the bearer, a pivot-spring connection between each lever and the bearer, a bogie carried by each end of each of the levers on opposite sides of their pivots, rollers carried by the bogies, and a caterpillar passing under the rollers.

In testimony whereof I affix my signature, in presence of two witnesses.

ERNEST FUCHS. [L. S.]

Witnesses:
JOSEPH GEMNENIE,
HIPPALYTE JOTTE.